Dec. 4, 1962    J. H. KITTEL ET AL    3,067,116
PROTECTED NUCLEAR FUEL ELEMENT
Filed March 6, 1961
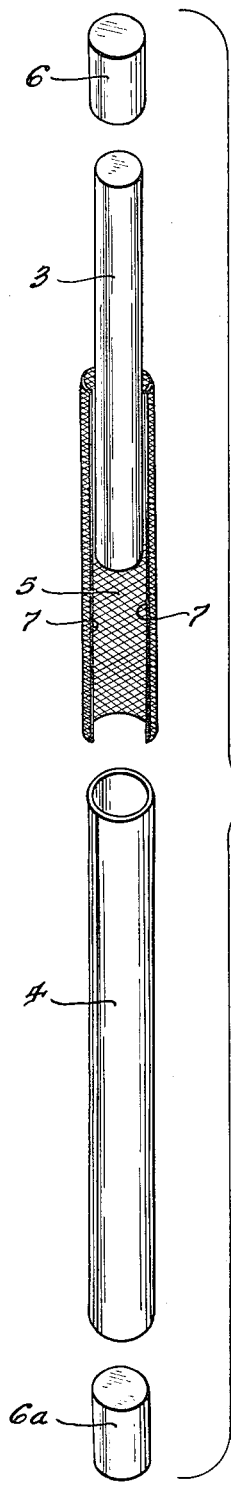
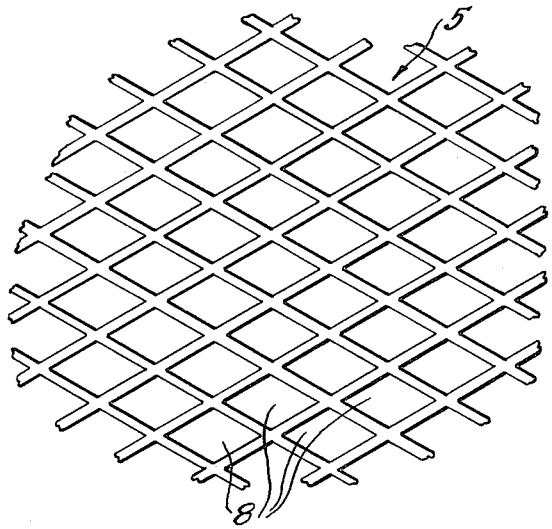
INVENTORS
John Howard Kittel
James F. Schumar
BY
Attorney

3,067,116
PROTECTED NUCLEAR FUEL ELEMENT

John Howard Kittel, Naperville, Ill., and James F. Schumar, San Diego, Calif., assignors to the United States of America as represented by the United States Atomic Energy Commission
Filed Mar. 6, 1961, Ser. No. 93,819
4 Claims. (Cl. 204—154.2)

The invention relates to an improved fuel element for nuclear reactors, more particularly to such an element the stainless steel cladding of which is protected from damage on the inside during reactor operation.

In nuclear reactors of the "fast" type stainless steel is a preferred cladding material for the fuel elements due to its superior strength, machinability, and low cost compared to other material. Its comparatively large absorption cross-section for thermal neutrons, which limits its use in thermal reactors, is no objection in fast reactors.

Due to the high temperature at which fast reactors operate it is essential to have efficient heat transfer between the nuclear fuel and the cladding; for this reason it has been customary to place in the space between the two, a heat transfer agent such as sodium, the sodium-potassium alloy known as NaK, bismuth, or some such metal that is liquid at reactor operating temperatures. While this was effective in improving heat transfer between the fuel rod and the cladding, numerous failures of the latter were encountered after a period of reactor operation. Such cladding should, of course, be made as thin-walled as possible in order to facilitate heat transfer. On visual examination of cladding after a period of reactor use, small leak holes were often observed apparently originating on the inside, as evidenced by pitting in localized areas on the inner surface.

It is, accordingly, an object of the invention to provide a nuclear fuel element of improved resistance to damage on the inside of the cladding under the conditions of heat and radiation encountered in nuclear reactors.

The foregoing object is attained by our discovery that, at the high temperatures at which fast reactors operate, eutectic formation takes place in small areas where the uranium, plutonium, or other actinide nuclear fuel comes into contact with the stainless steel cladding and alloys with it, but that an extremely small physical separation of these two by means of a thin perforated barrier is all that is necessary to prevent such eutectic formation from taking place even though the two are bathed in a liquid metal therebetween. The perforations in the barrier permit the heat transfer by the liquid metal to continue unimpaired, yet they do not permit alloying to take place between the fuel and the cladding.

We have further discovered an economical method of bringing about the required separation using commercially available materials, which is to form the thin barrier above mentioned of sheets of expanded pre-slit metal. The metal must be one which remains solid at reactor operating temperatures and does not form alloys with actinide fuels, stainless steel, or alkali metal heat transfer agents. More particularly, the metals of the class consisting of columbium, tantalum, molybdenum, tungsten, zirconium, and vanadium have the desired characteristics mentioned, and also are sufficiently ductile so that they may be slit and expanded.

Of course, the principle of our invention would be operative in other situations than in fast reactors, but since thermal reactors, for example, generally use cladding that does not alloy with actinide metals there is no practical need for it. Likewise there may be some other metals which could be used to bring about the physical separation of the fuel and cladding such as the six metals of the platinum group; however, since these are extremely expensive and would function no better than the metals of the class above enumerated they are of theoretical interest only.

In carrying out our invention commercially available "expanded metal" sheets may be used in any convenient way, according to the configuration of the fuel rods and the cladding. Since, however, most fuel rods are solid cylinders with encasing cylindrical cladding, a fuel rod of this shape will be described, as shown by the figure, which is an exploded view of the fuel element assembly.

In FIGURE 1, 3 is a solid right cylinder of actinide fuel which may be uranium, plutonium, or an alloy of these or other metals. 4 is a hollow cladding cylinder having inside dimensions slightly greater than the outside dimensions of solid cylinder 3. 5 is an expanded pre-slit metal sheet having a length equal to the axis of cylinder 3 and a width slightly larger than the outside circumference of cylinder 3. 6 and 6a are plugs in cladding cylinder 4, these plugs preferably being formed of a member of the class consisting of columbium, tantalum, molybdenum, tungsten, zirconium and vanadium.

In putting the assembly together expanded metal sheet 5 is wrapped around solid fuel rod 3 lengthwise so that the long sides 7 meet and the two are inserted into the cladding cylinder and the plugs 6 and 6a inserted. So far as the basic principle of the invention is concerned it does not matter if sheet 5 fits quite loosely, or even if it overlaps somewhat around rod 3; however, in order to obtain optimum heat transfer and to save space the fit should be close without overlapping, and the space occupied by sheet 5 otherwise held to a minimum.

For the same reason it is desirable that sheet 5 be as thin as possible, and the perforations in sheet 5 be as numerous as possible while still preventing contact between the fuel and cladding. These are again not critical matters, but the practical importance of keeping the dimensions of sheet 5 to the minimum is real.

It would, of course, be possible to perforate sheet 5 by stamping, drilling, and the like, but all these conventional procedures are cumbersome and expensive when applied to small holes in as great numbers as are necessary to avoid loss of heat transfer by the liquid alkali metal. The makers of commercially available expanded metal sheets achieve the required number of perforations by making multiple slits on the bias in solid sheets of metal, and then pulling them apart to attain the structure shown in FIG. 2. FIG. 2 shows how sheet 5 is expanded into diamond shapes 8 to form a kind of continuous, perforate lattice.

Example

Solid right cylindrical fuel rods of plutonium alloyed with one percent by weight of aluminum were about $\%_{16}$ of an inch in diameter and about 1½ inches long. These were wrapped lengthwise with sheets of expanded niobium and placed inside closely fitting hollow cladding cylinders of stainless steel, liquid sodium was poured in until the cylinders were completely filled, and the open ends were closed with plugs of tantalum. The expanded niobium sheets had a minimum thickness of 0.003 inch, a maximum thickness of 0.008 inch, and a minimum strand of 0.007 inch. The sheet had from 41 to 43 diamond-shaped meshes per inch, and the average hole size was 0.001 inch.

Blanket elements were attached to both ends of the completed fuel element assemblies to make composite fuel and blanket rods of the type described in Peaceful Uses of Atomic Energy, United Nations, 1958, vol. 6, pages 501–505.

The composite rods were placed for about four months in a fast reactor of the "breeder" type having a flux of $10^{14}$ neutrons per square centimeter per second and an operating temperature of about 350° C., until one tenth percent burnup of the plutonium was achieved.

At the end of the four months the composite rods were withdrawn from the reactor and placed in a shielded cave having a window and a remote manipulator by which detailed visual observation was made. Such observation showed the complete absence of any leak holes of the type encountered in conventional fuel elements.

It will be understood that this invention is not to be limited to the details given herein, but that it may be modified within the scope of the appended claims.

What is claimed is:

1. A fast nuclear reactor fuel element comprising an inner actinide metal fuel rod, a strainless steel cladding, and therebetween a metal heat transfer agent and a thin perforated barrier, said barrier being made of a metal which remains solid at the operating temperatures of the reactor and does not alloy with strainless steel and the actinide metals, said heat transfer agent being liquid at reactor operating temperatures, the said barrier preventing contact between the actinide metal fuel rod and the stainless steel cladding at all points.

2. A fast nuclear reactor fuel element comprising an inner actinide metal fuel rod, a stainless steel cladding, and therebetween a metal heat transfer agent that is liquid at reactor operating temperatures and a thin perforated barrier of a metal selected from the class consisting of columbium, tantalum, molybdenum, tungsten, zirconium, and vanadium, the said barrier preventing contact between the actinide metal fuel rod and the stainless steel cladding at all points.

3. A fast nuclear reactor fuel element comprising an inner actinide metal fuel rod, a stainless steel cladding, and therebetween a liquid heat transfer agent and a thin barrier of pre-slit expanded metal which remains solid at the operating temperatures of the reactor and does not alloy with stainless steel and the actinide metals, the said barrier preventing contact between the actinide metal fuel rod and the stainless steel cladding at all points.

4. A fast nuclear reactor fuel element comprising an inner actinide metal fuel rod, a stainless steel cladding, and therebetween a liquid sodium potassium alloy and a thin barrier of pre-slit expanded metal selected from the class consisting of columbium, tantalum, molybdenum, tungsten, zirconium, and vanadium, the said barrier preventing contact between the actinide metal fuel rod and the stainless steel cladding at all points.

References Cited in the file of this patent

UNITED STATES PATENTS

| | | |
|---|---|---|
| 320,242 | Golding et al. | June 16, 1885 |
| 2,728,867 | Wilson | Dec. 27, 1955 |
| 2,838,452 | West et al. | June 10, 1958 |
| 2,938,848 | Ladd et al. | May 31, 1960 |
| 2,984,613 | Bassett | May 16, 1961 |
| 3,009,869 | Bassett | Nov. 21, 1961 |

OTHER REFERENCES

AEC Report TID 6506, August 1960, pages 11 and 73 relied upon.